United States Patent
Bouron et al.

(10) Patent No.: US 10,578,161 B2
(45) Date of Patent: Mar. 3, 2020

(54) SPACER FOR ROLLING BEARING, NOTABLY USED IN A WIND TURBINE

(71) Applicant: Aktiebolaget SKF, Gothenburg (SE)

(72) Inventors: Cyril Bouron, Auxerre (FR); Herve Dondaine, Avallon (FR)

(73) Assignee: Aktiebolaget SKF, Gothenburg (SE)

(*) Notice: Subject to any disclaimer, the term of this patent is extended or adjusted under 35 U.S.C. 154(b) by 0 days.

(21) Appl. No.: 16/015,901

(22) Filed: Jun. 22, 2018

(65) Prior Publication Data
US 2019/0003528 A1  Jan. 3, 2019

(30) Foreign Application Priority Data

Jun. 30, 2017 (DE) .......................... 10 2017 211 146

(51) Int. Cl.
| | | |
|---|---|---|
| *F16C 33/46* | (2006.01) | |
| *F16C 19/36* | (2006.01) | |
| *F16C 33/51* | (2006.01) | |
| *F16C 19/38* | (2006.01) | |

(52) U.S. Cl.
CPC .......... *F16C 33/467* (2013.01); *F16C 19/361* (2013.01); *F16C 19/38* (2013.01); *F16C 33/51* (2013.01); *F16C 2300/14* (2013.01); *F16C 2360/31* (2013.01)

(58) Field of Classification Search
CPC .... F16C 33/51; F16C 33/513; F16C 33/3818; F16C 33/467; F16C 33/4676; F16C 19/361; F16C 2360/31; F16C 2300/14
See application file for complete search history.

(56) References Cited

U.S. PATENT DOCUMENTS

| | | | | |
|---|---|---|---|---|
| 3,501,212 A | * | 3/1970 | Husten ................... | F16C 19/30 384/614 |
| 3,938,866 A | * | 2/1976 | Martin .................... | F16C 19/30 384/623 |
| 4,557,614 A | * | 12/1985 | Knappe .................. | F16C 19/26 384/573 |
| 9,127,717 B1 | * | 9/2015 | Bouron ................... | F16C 33/51 |
| 9,458,886 B2 | * | 10/2016 | Gessendorfer ......... | F16C 43/06 |

(Continued)

FOREIGN PATENT DOCUMENTS

| | | | | |
|---|---|---|---|---|
| JP | 2008064248 A | * | 3/2008 | ............ F16C 19/386 |
| WO | 2012/126529 A1 | | 9/2012 | |
| WO | 2012/155946 A1 | | 11/2012 | |

OTHER PUBLICATIONS

Machine Translation of JP 2008-064248 (Year: 2008).*

*Primary Examiner* — Alan B Waits
(74) *Attorney, Agent, or Firm* — Garcia-Zamor Intellectual Property Law; Ruy Garcia-Zamor; Bryan Peckjian

(57) ABSTRACT

A spacer includes opposite first and second portions facing one another, and at least two spaced reinforcing beams connected to the first and second portions and extending transversally with respect to the portions, the reinforcing beams being disposed both on one side of the first and second portions. The spacer further includes at least one abutting beam connected to the first and second portions, extending transversally with respect to the portions and located on the side opposite to the reinforcing beams. The first and second portions delimit together with the reinforcing and abutting beams a pocket configured to receive at least a contact roller.

8 Claims, 3 Drawing Sheets

(56) References Cited

U.S. PATENT DOCUMENTS

| | | | | |
|---|---|---|---|---|
| 2001/0038724 A1* | 11/2001 | Murata | ............... | F16C 29/065 384/44 |
| 2013/0287331 A1* | 10/2013 | Sekido | ................. | E02F 9/123 384/623 |
| 2015/0147017 A1* | 5/2015 | Yasuda | ............... | F16C 33/467 384/577 |

* cited by examiner

SPACER FOR ROLLING BEARING, NOTABLY USED IN A WIND TURBINE

CROSS-REFERENCE

This application claims priority to German patent application no. 102017211146.1 filed on Jun. 30, 2017, the contents of which are fully incorporated herein by reference.

TECHNOLOGICAL FIELD

The present invention relates to the field of rolling bearings, in particular rolling bearings having an inner ring and an outer ring with one or more rows of contact rollers therebetween.

BACKGROUND

The invention relates more particularly to the field of large-diameter rolling bearings adapted to be used in a wind turbine.

SUMMARY

In such application, rolling bearings are used to angularly orient the rotor of the turbine according to the direction of the wind, and to orient the blades of the turbine around their longitudinal axes. Such rolling bearings are loaded mainly by stress, both axially and radially, often with a relatively strong load.

Patent application WO 2012/126529 (SKF) discloses a rolling bearing for a wind turbine comprises two concentric inner and outer rings, two rows of oblique contact rollers arranged between raceways and guiding faces provided on the rings, and a plurality of conical spacers disposed circumferentially between the rollers. Each spacer generally comprises two opposite cavities having a concave profile adapted to the rollers and delimited axially by lateral flanges, and two opposite inner and outer planar surfaces.

The planar surfaces and lateral flanges of each spacer may respectively come into contact with the raceways and the guiding faces of the inner and outer rings. Such contacts between the spacers and the rings induce an increase of the friction torque of the rolling bearing.

Patent application WO 2012/155946 (SKF) discloses a conical spacer for rolling bearing designed to reduce its friction contribution. However, the applicant has observed that such spacer shows weakness. As a matter of fact, high compression loads take place between rollers and spacers during operation of the wind turbine, causing deformations of the spacers. This notably leads to excessive sliding of the rollers and spacers against the inner and outer rings as well as removal of lubricant on the raceways of the ring and premature wear.

One aim of the present invention is to overcome these drawbacks.

It is a particular object of the present invention to provide a spacer having a good stiffness while guaranteeing low deformations during operation.

The spacer is adapted for a rolling bearing comprising an inner ring, an outer ring and at least one row of contact rollers disposed between raceways provided on the rings.

In one embodiment, the spacer comprises opposite first and second portions facing one another, and at least two spaced reinforcing beams connected to the first and second portions and extending transversally with respect to the portions. The reinforcing beams are disposed both on one side of the first and second portions.

The spacer further comprises at least one abutting beam connected to the first and second portions, extending transversally with respect to the portions and located on the side opposite to the reinforcing beams. The first and second portions delimit together with the reinforcing and abutting beams a pocket configured to receive at least a contact roller.

The first and second portions each comprise an inner contact surface with an end face of the roller. The reinforcing and abutting beams may also each comprise an inner contact surface forming a bearing surface for an exterior rolling surface of the roller.

Preferably, an outer surface of the abutting beam comprises a concave spherical portion oriented outwards and having a profile corresponding to profile of the rolling surface of the contact roller. The outer surface of the abutting beam may further comprise two convex spherical portions arranged laterally on each side of the concave spherical portion. Advantageously, the convex spherical portions are not symmetrical to one another with respect to a plan passing through the center of the abutting beam.

Preferably, the spacer further comprises concave spherical portions each formed on one of the lateral edges of the first and second portions and located between the reinforcing beams. The concave spherical portions may be not symmetrical to one another with respect to a plan passing through the center of the reinforcing beams. Advantageously, the radius of each concave spherical portion is greater to the radius of each convex spherical portion.

In one embodiment, the spacer further comprises a first linking portion extending from one of the first and second portions, and a second linking portion extending from the other of the first and second portions, the abutting beam extending transversally between the first and second linking portions. Each of the first and second linking portions may extend from a lateral edge of the associated first or second portion.

The general structure of a spacer provided with first and second linking portions is lightened. Alternatively, it could be however be possible to foresee a spacer deprived of linking portions and comprising reinforcing beams extending transversally between the inner contact surfaces of the first and second portions and connected to the surfaces. In this case, the first and second portions have an increases length.

The reinforcing beams may extend transversally between the first and second portions. Preferably, the reinforcing beams extend transversally between the inner contact surfaces of the first and second portions and are connected to the surfaces. Each of the reinforcing beams may disposed at a corner of the first and second portions.

In one particular embodiment, one of the reinforcing beams has an increased width with respect to the other reinforcing beam in order to be able to retain the associated roller inside the pocket.

Preferably, the spacer may be formed in one part from metal, such as brass or bronze. Alternatively, the spacer may be made from polymer material. The abutting beam and the first and second portions may have in cross-section the overall shape of a C.

The invention also relates to a rolling bearing comprising an inner ring, an outer ring, at least one row of contact rollers disposed between raceways and guiding surfaces provided on the rings, and a plurality of spacers as previously defined disposed circumferentially between the rollers, the abutting beam of each spacer coming into contact against the adjacent spacer and against the roller housed inside the adjacent roller.

Preferably, each roller is sized with respect to the pocket of the associated spacer such that a circumferential gap is provided between the roller and the abutting beam or the reinforcing beams of the spacer.

In use, the compressing loads exerting on the abutting beam of each spacer by the adjacent spacer are transmitted to the first and second portions of the spacer instead of acting on the roller supported by the spacer at is was the case for the conventional conical spacers. The same low compressive force applies on each roller instead of high cumulative compressive force. The deformations of the spacers are strongly reduced.

Otherwise, the use of reinforcing beams makes it possible to increase the mechanical strength of the spacer and to reduce the deformations of the first and second portions. The number of rollers disposed between the inner and outer rings may also be increased. This leads to higher load bearing capacity of the rolling bearing as well as an increase of the service life.

The rolling bearing as previously defined may be particularly useful as a bearing for a wind turbine.

BRIEF DESCRIPTION OF THE DRAWINGS

The present invention and its advantages will be better understood by studying the detailed description of specific embodiments given by way of non-limiting examples and illustrated by the appended drawings on which.

DETAILED DESCRIPTION

Figure 1:
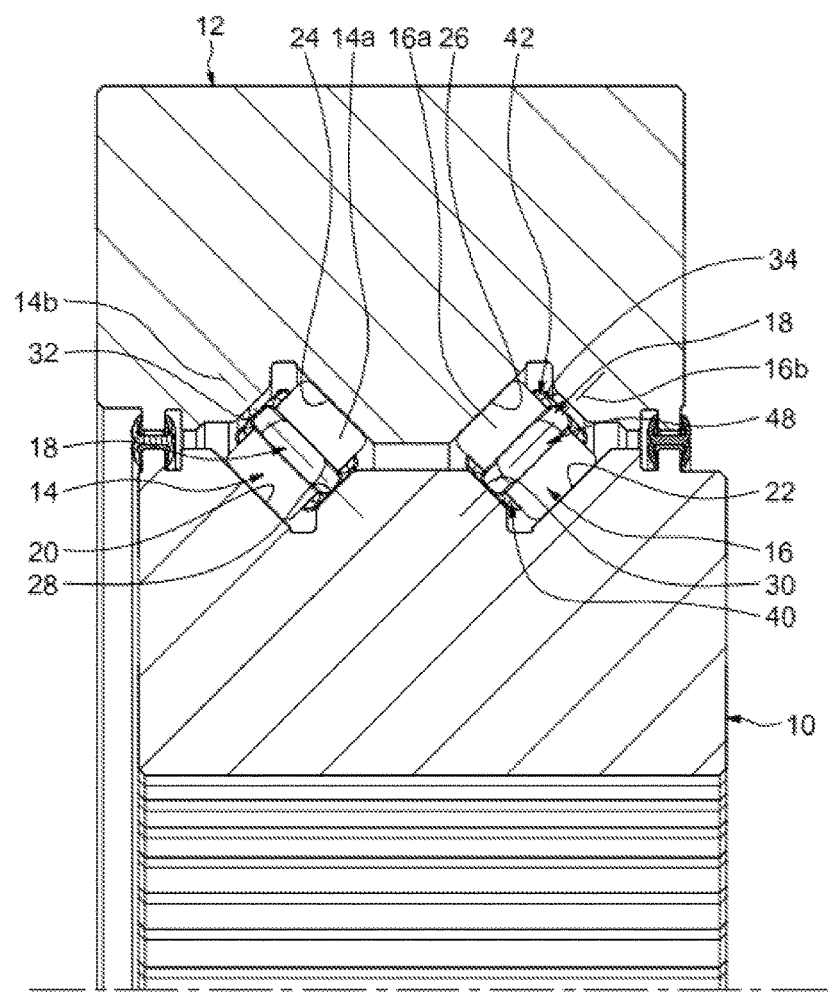
FIG. 1 is a half section of a rolling bearing according to a first example of the invention.

The rolling bearing as illustrated on FIG. 1 is a large-diameter rolling bearing comprising an inner ring 10 and an outer ring 12 between which are housed two rows of oblique or angular contact rollers 14 and 16. The rolling bearing also comprises a plurality of spacers 18 disposed circumferentially between the rollers 14, 16 to maintain their circumferential spacing. The spacers 18 each exhibit a good stiffness and are adapted to avoid high deformations during operation.

The inner and outer rings 10, 12 are concentric and extend axially along the bearing rotation axis (not shown) of the rolling bearing. The rings 10, 12 are of the solid type.

The rollers 14, 16 are identical with one another and each comprise an exterior rolling surface 14a, 16a and opposite end transverse faces (not referenced) delimiting axially the rolling surface. In the illustrated embodiment, the rolling surfaces of each roller 14, 16 have a cylindrical profile. Alternatively, the rolling surfaces may have a spherical profile or a logarithmic profile. For each row, the rotation axes 14b, 16b of the rollers converge in one single point located on the longitudinal axis of the bearing, and are disposed at a determined angle with respect to the bearing axis. In the illustrated embodiment, the rotation axes 14b, 16b of the rollers of the two rows are arranged at an angle of 90° to each other, and of approximately of 45° to the bearing axis. The angle between the rotation axis 14b, 16b of each roller and the bearing axis may be comprised for example between 20° and 70°.

The inner ring 10 comprises an outer cylindrical surface onto which first and second annular raceways 20, 22 are formed. Each raceway 20, 22 extends obliquely inwards from the outer cylindrical surface of the inner ring and has a frustroconical shape. Each raceway 20, 22 has in cross section a straight internal profile in contact with the rolling surfaces 14a, 16a of the rollers.

Similarly, the outer ring 12 comprises first and second raceways 24, 26 formed on its cylindrical annular bore. The raceways 24, 26 are respectively parallel to the raceways 20, 22. Each raceway 24, 26 extends obliquely outwards from the bore of the outer ring and has a frustroconical shape. Each raceway 24, 26 has in cross section a straight internal profile in contact with the rolling surfaces 14a, 16a of the rollers. The raceways 20, 22 of the inner ring and the raceways 14a, 16a of the outer ring mutually face each other while at the same time being symmetric with regard to the rotation axis 14b, 16b of the rollers.

The inner ring 10 also comprises annular guiding faces 28, 30 formed onto its outer surface and which may be in contact with the spacers 18. Each guiding face 28, 30 is straight and disposed perpendicular to the corresponding raceway 20, 22 and is connected to the edge of small diameter of the raceway. Each guiding face 28, 30 extends radially relative to the rotation axis 14b, 16b of the rollers. Each guiding face 28, 30 and the associated raceway 20, 22 delimit a V-shaped groove directed radially outwards.

The outer ring 12 also comprises guiding faces 32, 34 formed into its bore and which may be in contact with the spacers 18. The guiding faces 32, 34 and the guiding faces 28, 30 mutually face each other and are respectively parallel. Each guiding face 32, 34 is straight and disposed perpendicular to the corresponding raceway 28, 30 and is connected to the edge of large diameter of the raceway. Each guiding face 32, 34 extends radially relative to the rotation axis 14b, 16b of the rollers. Each guiding face 32, 34 and the associated raceway 24, 26 delimit a V-shaped groove directed radially inwards.

The raceway 20 and the guiding face 28 of the inner ring define together with the raceway 24 and the guiding face 32 of the outer ring a first annular space inside which the rollers 14 and the spacers 18 are housed. The rolling surfaces 14a of the rollers are in contact with the raceways 20, 24. Each roller 14 arranged between the raceways 20, 24 is maintained by the associated spacer 18 which may bear against the guiding faces 28, 32.

Similarly, the raceway 22 and the guiding face 30 of the inner ring define together with the raceway 26 and the guiding face 34 of the outer ring a second annular space inside which the rollers 16 and the spacers 18 are disposed. Each roller 16 arranged between the raceways 22, 26 is maintained by the associated spacer 18 which may bear against the guiding faces 30, 34.

For the introduction of the rollers 14, 16 and the associated spacers 18 into the first and the second annular spaces defined between the inner and outer rings 10 and 12, the outer ring comprises filling orifices (not shown) each extending radially from the outer cylindrical surface and opening into one of the annular spaces delimited by the raceways and the guiding faces. The outer ring also comprises two plugs closing the filling orifices and each comprising two planar surfaces which respectively replace locally the raceway and the guiding face of the outer ring.

The spacers 18 are identical with one another and each placed between two consecutive rollers 14, 16 of each row. The spacers 18 may advantageously be made in one part from metal, for instance from brass or bronze.

Figure 2:
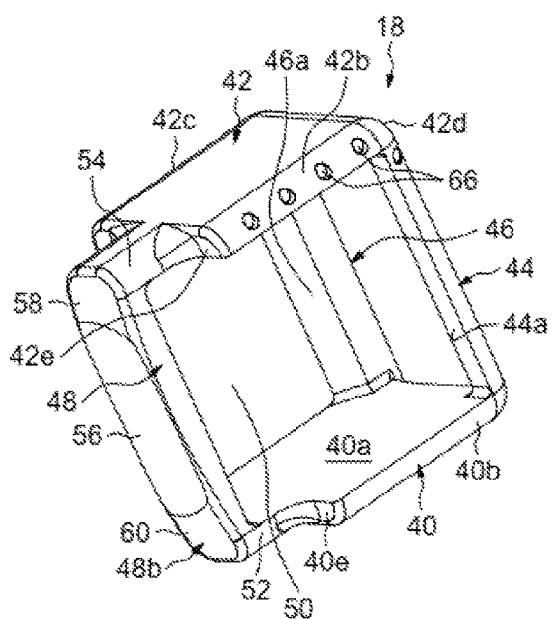
FIGS. 2 and 3 are perspective views of a spacer of the rolling bearing of FIG. 1, FIGS. 4 and 5 are respectively top and side views of the spacer of FIGS. 2 and 3.
Figure 3:
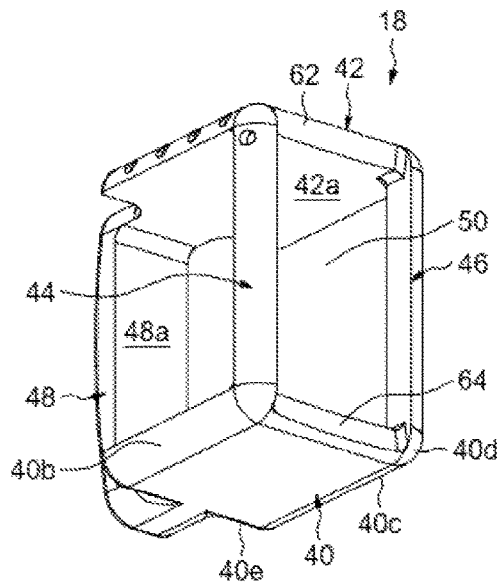

As shown more clearly on FIGS. 2 and 3, each spacer 18 comprises two parallel opposite first and second portions 40, 42, and two spaced first and second lateral reinforcing beams 44, 46 extending transversally between the portions 40, 42. Each spacer 18 further comprises an abutting beam 48 connected to the first and second portions 40, 42 and extending transversally with respect to the portions. The reinforcing beams 44, 46 are disposed both on one side of the first and second portions 40, 42 and the abutting beam 48 is disposed on the opposite side. The reinforcing beams 44, 46 of each spacer are adapted to be located circumferentially between two adjacent rollers. The abutting beam 48 of each spacer is also adapted to be located circumferentially between two adjacent rollers. The first and second portions 40, 42 and the lateral abutting beam 48 have in cross-section the overall shape of a C.

As shown on FIG. 1, the first and second portions 40, 42 of each spacer forming inner and outer portions are respectively adapted to come into direct contact with the guiding faces 30, 34 and 28, 32 of the inner and outer rings.

Referring once again to FIGS. 2 and 3, the first and second portions 40, 42 and the beams 44, 46, 48 delimit a pocket 50 for receiving one roller. In the mounted position of the spacer 18 into the rolling bearing, the pocket 50 is delimited in the circumferential direction by the abutting beam 48 on one side and by the reinforcing beams 44, 46 on the other side. Since the reinforcing beams 44, 46 are spaced with one another, the pocket 50 is laterally open between these two beams. In others words, in the mounted position of the spacer 18 into the rolling bearing, the pocket 50 is circumferentially open towards the adjacent spacer between the reinforcing beams 44, 46. An opening or aperture is defined between the reinforcing beams 44, 46. The pocket 50 is open laterally through the aperture.

In the mounted position of the spacer 18 into the rolling bearing, the pocket 50 is delimited in the radial direction by the first and second portions 40, 42. The pocket 50 is open axially in the two directions. With regard to the rotation axis of the associated roller, the first and second portions 40, 42 extend radially and the beams 46 to 48 extend axially.

The first and second lateral portions 40, 42 of each spacer are parallel to one another. The first and second portions 40, 42 have inner planar contact surfaces 40a, 42a facing each other and forming bearing surfaces for the end faces of the associated roller. The gap between the planar contact surfaces 40a, 42a is substantially equal to the length of the roller. The first and second portions 40, 42 each have a rectangular shape with similar length and thickness. The width of the portions 40, 42 is smaller than the radius of the roller.

The first portion 40 is delimited in by two opposite longitudinal edges 40b, 40c and by two opposite lateral edges 40d, 40e. Similarly, the second portion 42 is also delimited by two opposite longitudinal edges 42b, 42c and by two opposite lateral edges 42d, 42e.

The reinforcing beams 44, 46 of each spacer extend transversally between the planar contact surfaces 40a, 42a of the first and second portions and are connected to the surfaces. The reinforcing beams 44, 46 are disposed on the side opposite to the abutting beam 48.

The first reinforcing beam 44 extends the facing ends of the longitudinal edges 40b, 42b of the first and second portions. The beam 44 also extends the facing ends of the lateral edges 40d, 42d. The reinforcing beam 44 is disposed at a corner of the planar contact surfaces 40a, 42a of the first and second portions. The second reinforcing beam 46 faces the first reinforcing beam 44. The first second reinforcing beam 44 extends the facing ends of the longitudinal edges 40c, 42c of the first and second portions. The beam 46 also extends the facing ends of the lateral edges 40d, 42d. The reinforcing beam 46 is disposed at another corner of the planar contact surfaces 40a, 42a of the first and second portions. The reinforcing beams 44, 46 are spaced apart one from another along the facing lateral edges 40d, 42d of the first and second portions 40, 42.

Each of the reinforcing beams 44, 46 comprises an inner planar contact surface 44a, 46a forming a bearing surface for the rolling surface of the associated roller which is directed inward towards the pocket 50. The contact surface 44a of the first reinforcing beam is oriented towards the lateral edges 40e, 42e of the first and second portions. In the illustrated example, the contact surface 46a of the second reinforcing beam is oriented towards the longitudinal edges 40b, 42b of the first and second portions. Here, the reinforcing beam 46 has a larger width than the one of the other reinforcing beams 44 in order to make easier the mounting of the spacer 18 and its associated roller into the rolling bearing. As a matter of fact, the roller is carried by the reinforcing beam 46 before to be mounted into the rolling bearing on one side of the spacer. In the disclosed example, the contact surface 44a, 46a of each reinforcing beam is planar. Alternatively, at least one of these contact surfaces 44a, 46a may be concave.

In the illustrated example, the spacer 18 further comprises linking portions 52, 54 to connect the abutting beam 48 to the first and second portions 40, 42. The linking portion 52 extends from the lateral edge 40e of the first portion. The linking portion 54 extends from the lateral edge 42e of the second portion. The abutting beam 48 is connected to the linking portions 52, 54 on the side opposite to the first and second portions 40, 42. The abutting beam 48 extends transversally between the linking portions. The linking portions 52, 54 have a reduced width with respect to the first and second portions 40, 42. The linking portions 52, 54 have inner planar contact surfaces (not referenced) facing each other and forming bearing surfaces for the end faces of the associated roller. The contact surface of each linking portion 52, 54 is coplanar with the contact surface 40a, 42a of the associated first or second portion. The first portion 40 and the linking portion 52 are respectively symmetric to the second portion 42 and the linking portion 54 with respect to a plan passing through the center of the abutting beam 48 and the reinforcing beams 44, 46.

The abutting beam 48 comprises an inner planar contact surface 48a forming a bearing surface for the rolling surface of the associated roller which is directed inward towards the pocket 50. Alternatively, the contact surface 48a may be concave. The abutting beam 48 also comprises an outer surface 48b opposite to the inner surface 48a.

Figure 5:
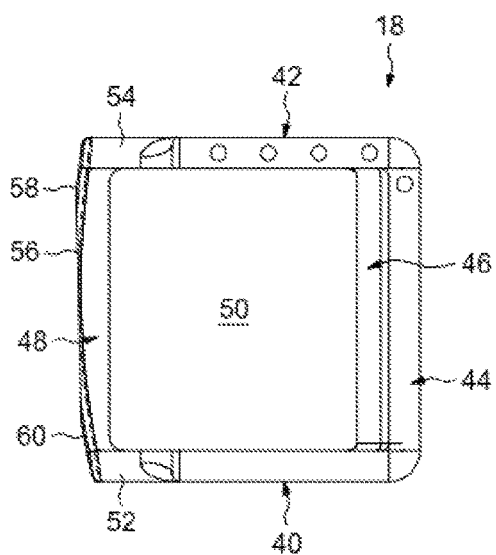

As shown on FIGS. 2 and 5, the outer surface 48b is provided with a central concave spherical portion 56 and two convex spherical portions 58, 60 arranged laterally one on each side of the concave portion. The concave spherical portion 56 and the convex spherical portions 58, 60 are oriented outwards. The concave spherical portion 56 has a profile corresponding to profile of the rolling surface of the rollers. Each convex spherical portion 58, 60 extends one lateral edge of the concave portion and is connected to one of the linking portions 52, 54. The convex spherical portions 58, 60 are not symmetrical to one another with respect to the plan passing through the center of the abutting beam 48 and the reinforcing beams 44, 46. The convex spherical portions 58, 60 radiate according to two different directions. In other words, the centers of the convex spherical portions 58, 60 are different. The radii of the portions may also be different.

Figure 4:
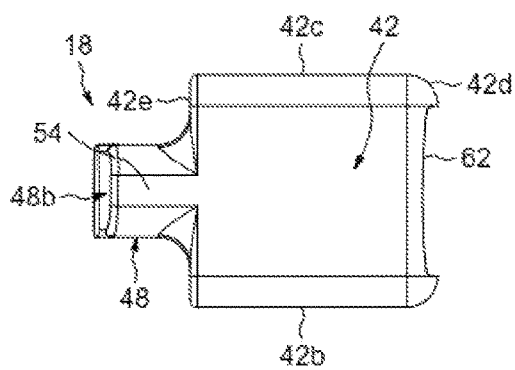

As shown on FIGS. 3 and 4, the spacer further comprises concave spherical portions 62, 64 each formed on one of the lateral edges 40d, 42d of the first and second portions. The concave spherical portions 62, 64 are oriented outwards. The concave spherical portions 62, 64 extend longitudinally between the reinforcing beams 44, 46. The convex spherical portions 62, 64 are not symmetrical to one another with respect to the plan passing through the center of the abutting beam 48 and the reinforcing beams 44, 46. The convex spherical portions 62, 64 radiate according to two different directions. The radius of each concave spherical portion 62, 64 is greater to the radius of each convex spherical portion 58, 60 of the abutting beam 48.

The spacer 18 further comprises fool proof recesses 66 formed on the second portion 42 and the abutting beam 44 to assure that the spacers are correctly mounted inside the roller bearing since the concave spherical portions 62, 64 and the convex spherical portions 62, 64 are not symmetric.

Figure 6:
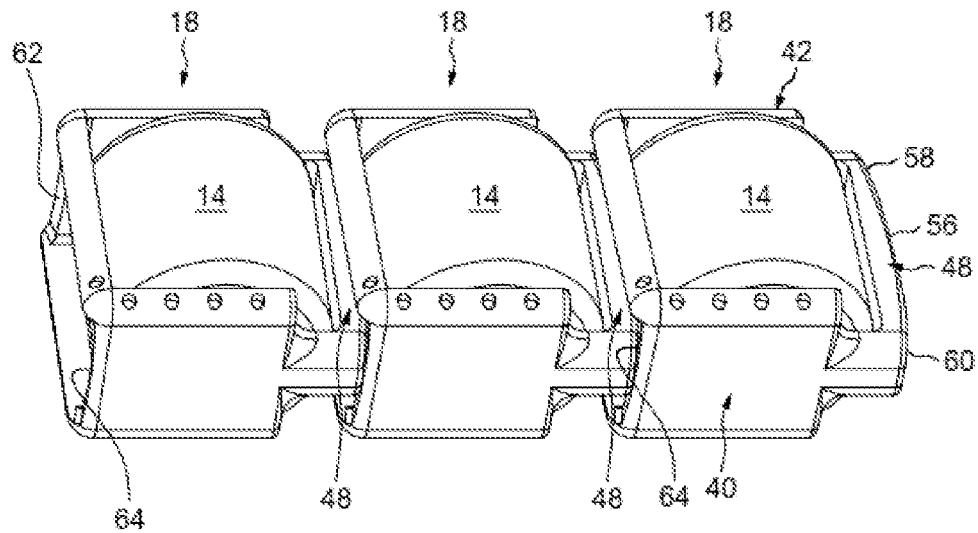
FIG. 6 is a perspective view showing three spacers and the associated rollers as mounted in the rolling bearing.

In the mounted position of the spacers 18 as shown on FIG. 6, the abutting beam 48 of one spacer 18 bears against the adjacent spacer 18 and the roller 14 housed into the adjacent spacer. More precisely, the concave spherical portion 56 of the abutting beam abuts against the rolling surface of the roller housed into the adjacent spacer 18 and the convex spherical portions 58, 60 respectively abut against the concave spherical portions 62, 64 of the adjacent spacer. There is a direct contact between the concave spherical portion 56 of the abutting beam 48 of one spacer and the adjacent roller 14 supported by the successive spacer in the circumferential direction. There are also direct contacts between the convex spherical portions 58, 60 of one spacer and the concave spherical portions 62, 64 of the successive spacer in the circumferential direction. Otherwise, each roller is sized with respect to the pocket of the associated spacer 18 such that a circumferential gap is provided between the roller and the abutting beam 48 or the reinforcing beams 44, 46 of the spacer.

Figure 7:
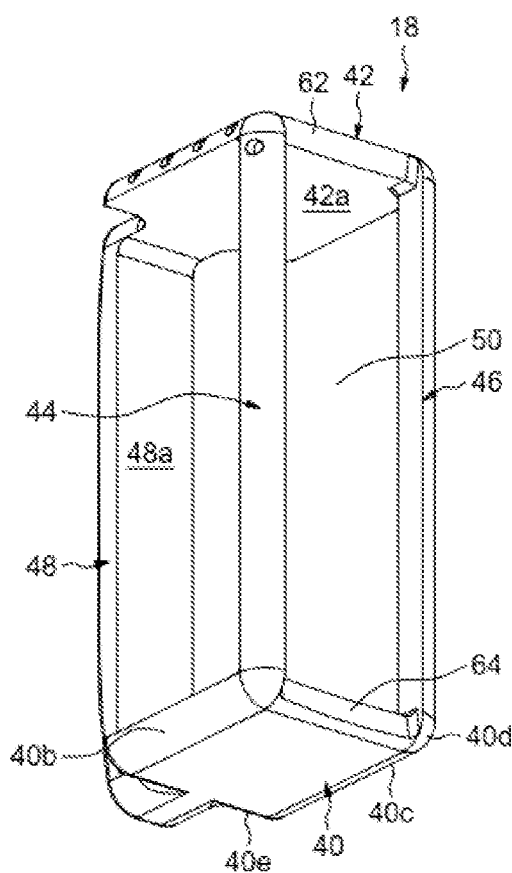
FIG. 7 is a perspective view of a spacer according to a second example of the invention with its associated roller.

In this example, the spacer 18 is adapted to maintain one roller. In the second example illustrated on FIG. 7, in which identical parts are given identical references, the spacer 18 is adapted to maintain a pair of two superposed rollers.

Although the invention has been illustrated on the basis of a rolling bearing having a double row of oblique contact rollers, it should be understood that the invention can be applied to bearings having a simple row of rollers or at least three rows of rollers. Otherwise, in the illustrated embodiments, the rolling bearings are O-type bearings. Alternatively, it may also be possible to foresee X-type rolling bearings.

Furthermore, the inner ring and/or the outer ring may comprise gearing teeth so as to be connected to driving gears for instance connected to the output shaft of a motor. In another embodiment, the inner ring and/or the outer ring may be connected to a jack, for example a hydraulic or pneumatic jack.

What is claimed is:

1. A rolling bearing comprising:
   an inner ring,
   an outer ring,
   at least one row of contact rollers disposed between the inner ring and the outer ring, and
   a spacer comprising:
      opposite first and second portions facing one another, and
      at least two spaced reinforcing beams connected to the first and second portions and extending transversally with respect to the portions, the reinforcing beams being disposed both on one side of the first and second portions,
      at least one abutting beam connected to the first and second portions, extending transversally with respect to the portions and located on the side opposite to the reinforcing beams, the first and second portions delimit together with the reinforcing and abutting beams a pocket configured to receive at least one of the contact rollers, and
      wherein a central portion of an outer surface of the abutting beam comprises a concave spherical portion opening outwards, relative to the pocket, and having a profile corresponding to the rolling surface of the contact roller, first and second ends of the outer surface of the abutting beam each include one of two convex spherical portions such that the two convex spherical portions are arranged one on each lateral side of the concave spherical portion.

2. The rolling bearing according to claim 1, wherein the two convex spherical portions are not symmetrical to one another with respect to a plane passing through the center of the abutting beam.

3. The rolling bearing according to claim 1, wherein each of the first and second portions comprise a lateral edge located between the reinforcing beams that defines a concave section which opens outwardly relative to the pocket.

4. The rolling bearing according to claim 3, wherein a central portion of an outer surface of the abutting beam comprises a concave spherical portion opening outwards, relative to the pocket, first and second ends of the outer surface of the abutting beam each include one of two convex spherical portions such that the two convex spherical portions are arranged one on each lateral side of the concave spherical portion, and wherein the radius of the concave spherical portion is greater than the radius of each of the two convex spherical portions.

5. The rolling bearing according to claim 1, further comprising a first linking portion extending from one of the first and second portions, and a second linking portion extending from the other of the first and second portions, the abutting beam extending transversally between the first and second linking portions.

6. The rolling bearing according to claim 1, wherein one of the reinforcing beams has an increased width with respect to the other reinforcing beam in order to be able to retain the associated roller inside the pocket.

7. A rolling bearing comprising:
   an inner ring,
   an outer ring,
   at least one row of contact rollers disposed between raceways provided on the rings, and
   a spacer comprising:
      opposite first and second portions facing one another, and
      at least two spaced reinforcing beams connected to the first and second portions and extending transversally with respect to the portions, the reinforcing beams being disposed both on one side of the first and second portions, at least one abutting beam connected to the first and second portions, extending transversally with respect to the portions and located on the side opposite to the reinforcing beams, the first and second portions delimit together with the reinforcing and abutting beams a pocket configured to receive at least one of the contact rollers, and wherein each of the first and second portions comprise a lateral edge located between the reinforcing beams that defines a concave section which opens outwardly relative to the pocket, wherein the concave section of each of the first and second portions are not symmetrical to one another with respect to a plane passing through the center of the reinforcing beams.

8. A rolling bearing comprising:

an inner ring, an outer ring, at least one row of contact rollers disposed between raceways and guiding surfaces provided on the rings, and a plurality of spacers disposed circumferentially between the rollers, each of the plurality of spacers comprising:

opposite first and second portions facing one another, and at least two spaced reinforcing beams connected to the first and second portions and extending transversally with respect to the portions, the reinforcing beams being disposed both on one side of the first and second portions, at least one abutting beam connected to the first and second portions, extending transversally with respect to the portions and located on the side opposite to the reinforcing beams, the first and second portions delimit together with the reinforcing and abutting beams a pocket configured to receive at least one of the contact rollers, and wherein a central portion of an outer surface of the abutting beam comprises a concave spherical portion opening outwards, relative to the pocket, and having a profile corresponding the rolling surface of the contact roller, first and second ends of the outer surface of the abutting beam each include one of two convex spherical portions such that the two convex spherical portions are arranged one on each lateral side of the concave spherical portion, the abutting beam coming into contact against an adjacent one of the plurality of spacers and the roller housed therein, each roller being sized with respect to the pocket of the associated spacer such that a circumferential gap is provided between the roller and the abutting beam or the reinforcing beams of the spacer.

* * * * *